United States Patent

Leggett

[11] Patent Number: 6,132,330
[45] Date of Patent: Oct. 17, 2000

[54] INFINITELY VARIABLE TRANSMISSION

[76] Inventor: Aaron D. Leggett, 1896 S. Chickasaw, Joplin, Mo. 64804

[21] Appl. No.: 08/967,803

[22] Filed: Nov. 12, 1997

[51] Int. Cl.[7] ....................................................... F16H 1/28
[52] U.S. Cl. ............................ 475/335; 475/346; 475/331
[58] Field of Search ................................... 475/346, 221, 475/296, 169, 170, 248, 249, 86, 89, 91, 204, 335, 218, 331; 74/410

[56] References Cited

U.S. PATENT DOCUMENTS

| | | | |
|---|---|---|---|
| 1,859,462 | 5/1932 | Perkins | 475/335 X |
| 2,893,268 | 7/1959 | Liebel | 475/346 |
| 3,080,775 | 3/1963 | Fritsch | 475/346 |
| 3,292,460 | 12/1966 | Fritsch | 475/347 |
| 3,572,167 | 3/1971 | Bosko et al. | 475/218 |
| 3,596,524 | 8/1971 | Cook | 475/218 X |
| 3,675,510 | 7/1972 | Duggar, Jr. | 475/346 X |
| 3,897,697 | 8/1975 | Chambers et al. | 475/80 |
| 3,899,941 | 8/1975 | Cook | 475/91 X |
| 4,555,963 | 12/1985 | Nelson | 475/195 |
| 4,759,229 | 7/1988 | Takahashi et al. | 74/409 |
| 4,846,008 | 7/1989 | Kraus | 475/194 |
| 4,901,602 | 2/1990 | Matoba | 475/335 |
| 5,171,194 | 12/1992 | Shen | 475/330 |
| 5,316,525 | 5/1994 | O'Keefe | 475/331 |
| 5,360,380 | 11/1994 | Nottle | 475/182 |
| 5,462,497 | 10/1995 | Cilano | 475/252 |
| 5,472,387 | 12/1995 | Kamlukin | 475/338 |
| 5,527,229 | 6/1996 | Ishihara et al. | 475/248 X |
| 5,800,302 | 11/1996 | Werre | 475/296 X |

*Primary Examiner*—Charles A Marmor
*Assistant Examiner*—Ankur Parekh
*Attorney, Agent, or Firm*—John D. Gassett

[57] ABSTRACT

This includes a first rotatable gear (such as a sun gear) and a second rotatable gear (such as a ring gear) spaced from the first rotatable gear. A rotatable inner gear is positioned between and meshes with both the first rotatable and the second rotatable gear. A force is selectively applied between the inner gear and the first gear as a second force is applied between the inner gear and the second gear. By properly selecting the magnitude of the first and second forces one can obtain a greater rotational movement of either the first gear or the second gear.

17 Claims, 9 Drawing Sheets

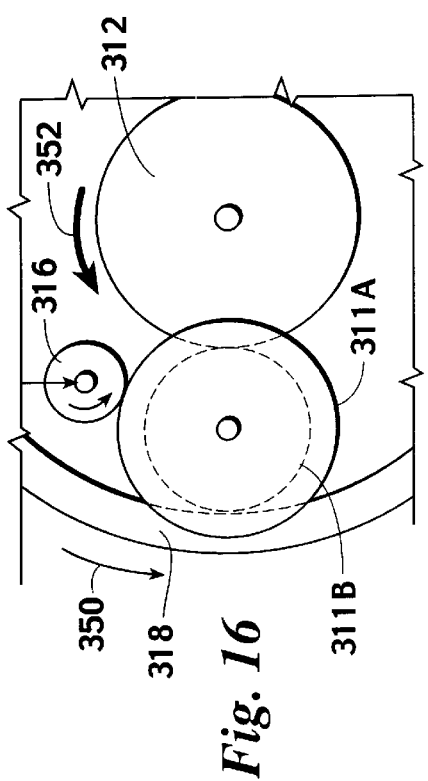
Fig. 16
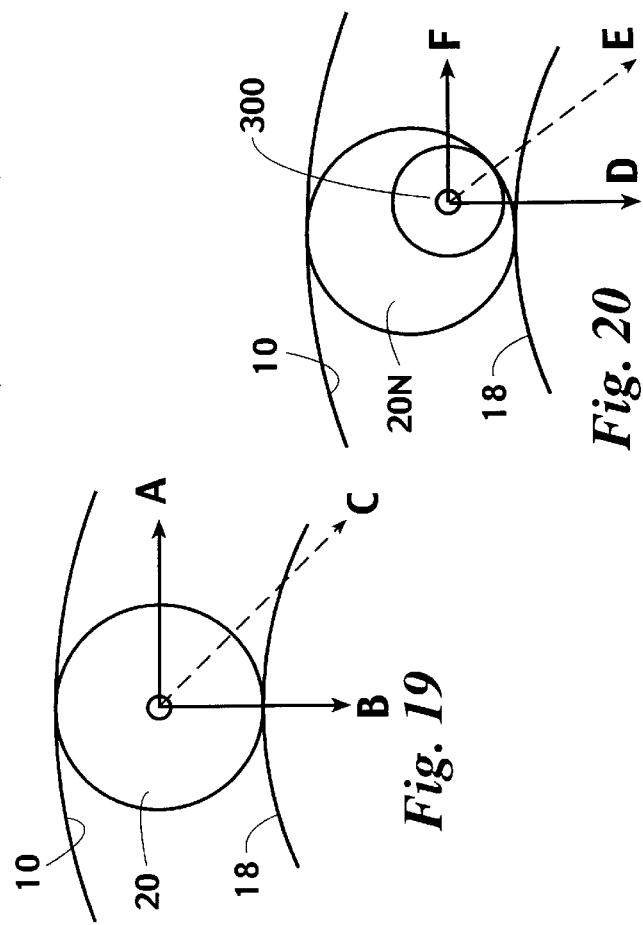
Fig. 20
Fig. 19
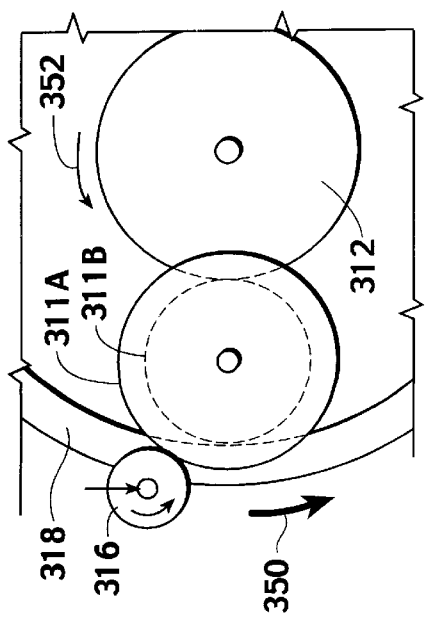
Fig. 15
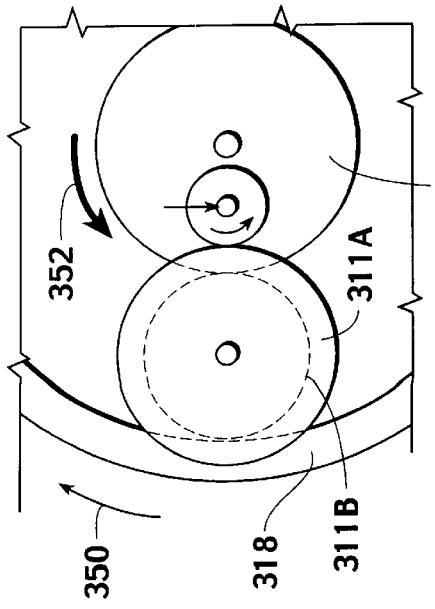
Fig. 17

:

INFINITELY VARIABLE TRANSMISSION

FIELD OF THE INVENTION

The invention relates generally to a device for transmitting power from an input source to an output source. It relates especially to such a device for varying the rotational speed ratio between the input source and the output source.

DESCRIPTION OF PRIOR ART

There are many variable transmissions currently in use for receiving an input with one rotational speed and converting it to an output of a second rotational speed. These type transmissions are found in wide use in the automobile industry. There are many types. A first type uses hydraulic pumps or turbines that use a liquid such as oil as a medium to transmit power to a driven pump. The turbine or pump has a rotational output which may be used to drive the drive wheels of an automobile or truck for example. This type transmission is costly, complicated and generally is not as efficient as a solid engagement gear style transmission. A second type constant variable transmission uses a split pulley and a V-belt to create a variable ratio change between the size of input pulley to output pulley and thus gives a continuously variable speed ratio between input and output speeds. This style transmission is generally able to handle relatively low power systems and they lose much of their input energy to friction between the pulley and the belt. A third type of variable speed transmission uses a flat drive plate whereby a second driven wheel contacts it upon its face at a right angle. The plate usually has a rubber or other resilient surface such that the driven wheel can be pushed from the outer circumference of the drive plate in toward the center thus changing the speed ratio between input to output. This style transmission also has power input limitations and has much more power loss in friction than those types of transmissions used today which have positive gear engagement.

One type transmission which uses positive gear engagement and is intended to produce variable ratios is described and illustrated in U.S. Pat. No. 5,360,380. This does use positive gear engagement to produce variable ratios. It still has certain inherent design problems. (i) It does not provide an infinite number of ratios to choose from and will therefore have to be shifted in ratios in synchronization with an interruption in power undoubtedly producing a jerking motion. (ii) It will have to be synchronized to avoid the mashing of teeth of a planet gear (19) into the chain (14) at the area of the bridging pieces (47) during the interim for which the diameter of the ring member is being changed. This diameter of the ring member appears to be changed in order to bring about the change in ratios. Timing cams (or solenoids) are a possible method of synchronizing the system, but the speed required to move the chain (14) in or out is great. (iii) There appears to be a great number of components needed to operate the device which may affect its cost effectiveness.

OBJECTIVES

It is an object of the present invention to eliminate many of the problems associated with nonpositive gear engagement transmissions such as hydraulic pumps thus greatly reducing the loss in power due to friction.

It is a still further object of this invention to provide a device having an infinite number of gear ratios which have a smooth transition from one ratio to the next ratio, which is not presently available in low friction positive gear engagement transmissions.

SUMMARY OF THE INVENTION

This invention describes a device or process by which the mechanical device has a continuously variable ratio between the input rotational speed and the output rotational speed. This allows the input device to develop a variation in torque output, based on the operator's desired requirements. The variable ratios between the input and output speeds are obtained with positive gear engagement and by doing so, reduces frictional loss and increases the efficiency over the prior art transmissions. The device has an infinite number of gear ratios between an input power source and an output driven device.

This device broadly includes a first rotatable gear and a second rotatable gear spaced apart from one another. A rotatable inner gear is positioned between the first rotatable gear and the second rotatable gear and the teeth of the inner gear meshes with teeth of the first and of the second gear. Means are provided for applying a first force between the inner gear and the first gear or a second force between the inner gear and the second gear. When the first force is greater than the second force, more rotational force is applied to push the second gear. This results in greater rotational movement of the second gear. When the magnitude of the forces is reversed, i.e., the second force is greater than the first force, then there is greater rotational movement of the first gear.

In another embodiment is an input ring gear and an input sun gear of different diameters but with a common center with an annular space therebetween. In this annular space there are planet gears, preferably three or more. Each planet gear meshes with the interior gears of the ring gear and the exterior gears of the sun gear. A yoke means is connected to the input power source and to the axles of the planet gears to cause the planet gears to move in a circular pattern with the center of this pattern being the same as the center of the sun gear and thus move in the annular space between the input ring gear and the input sun gear. This rotates the ring gear or the sun gear or both. Means are provided to provide a first force between the planet gear and the sun gear or a second force between the planet gear and the ring gear. By varying these forces I vary the rotational effect of the planet gears on the ring gears and on the sun gear to obtain variable rotation of the ring and sun gears.

In this embodiment, the output gear assembly of this device includes an output ring gear which is fixed to the input ring gear and they thus rotate together. It also includes an output sun gear which is on the same axis as the input sun gear and is fixed therewith and thus rotates together. There are output planet gears between the output ring gear and the output sun gear. A yoke-like member or equivalent is attached to the center or axle of each output planet gear and as the planet gears rotate the yoke rotates. The yoke is connected to an output gear to provide output rotational movement thereto. The center of the output sun gear and of the output ring gear is the same and the output planetary gears occupy the space between the output sun gear and the output ring gear.

I shall now briefly discuss the input side of this transmission device and how the variable rotational ratios are obtained.

The applied force between the planet gears and the sun gear and/or the ring gear can be varied and this variation of force obtains a variation in rotational ratios between the sun and ring gears. A power driven main arm is provided for selectively forcing the input planet gears toward the input ring gear and for forcing the input planet gear toward the input sun gear. When the input planet gear is forced against the sun gear with greater force than against the ring gear, more rotational force is applied to push the ring gear than is applied to push the sun gear. This results in greater rotational movement of the ring gear. If the radial force is reversed, i.e., the planet gear is forced against the ring gear with greater force than against the sun gear, more rotational force is applied to push the sun gear than to push the ring gear. By making this type of change, one gets variable rotational speed ratio between the sun gear and the ring gear. Thus, one has an infinitely variable transmission.

It is one object of this invention to have a mechanical device which has a continuously variable ratio between the input linear or rotational speed and the output speed which may be varied continuously.

It is a further object of the invention to develop a variable ratio capability between input and output speeds with positive gear engagement and by doing so, reduces frictional losses and increase efficiency.

It is also an object of this invention to develop a smooth transition throughout the speed ratio changes.

These and other objects may be had from the following detailed description in relation to the drawings in which:

BRIEF DESCRIPTION OF THE DRAWINGS

FIG. 14B is a view taken along the line 14B—14B of FIG. 14A;

FIG. 15 illustrates rotation of the sun gear and ring gear from a selective force on the planet gear;

FIG. 16 illustrates the rotation of the sun gear and ring gear when a different force is applied to the planet gear;

FIG. 17 illustrates the rotation of the sun gear and ring gear when still another force is applied to the planet gear;

FIG. 19 illustrates vector forces when an angular force that would be applied from an arm attached to planet gear;

FIG. 20 also illustrates vector forces when an angular force is applied through a bearing mounted inside a hollow planetary gear.

DETAILED DESCRIPTION OF THE INVENTION

Figure 1:
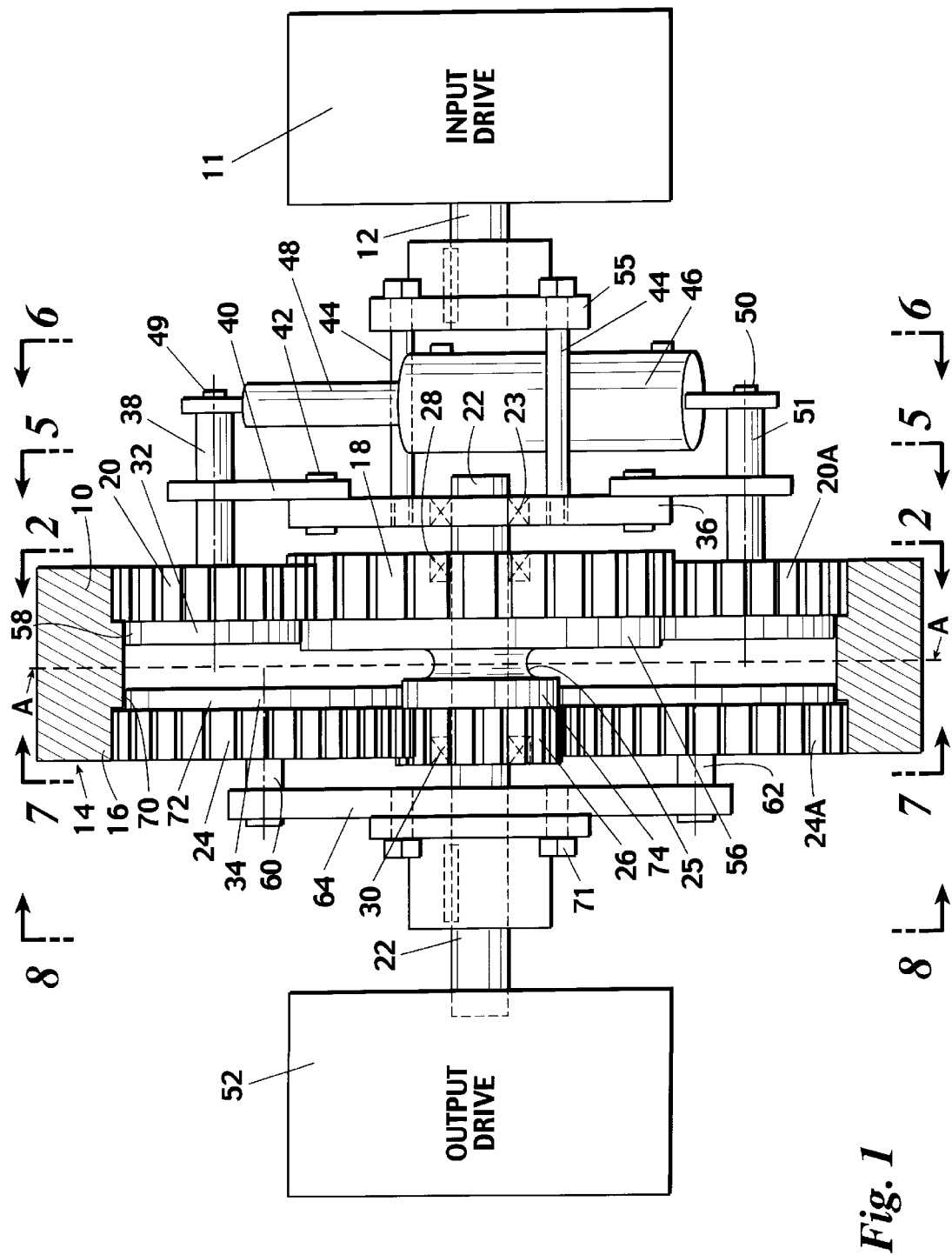
FIG. 1 is a view mostly in cross-section that illustrates one embodiment of my invention.
Figure 2:
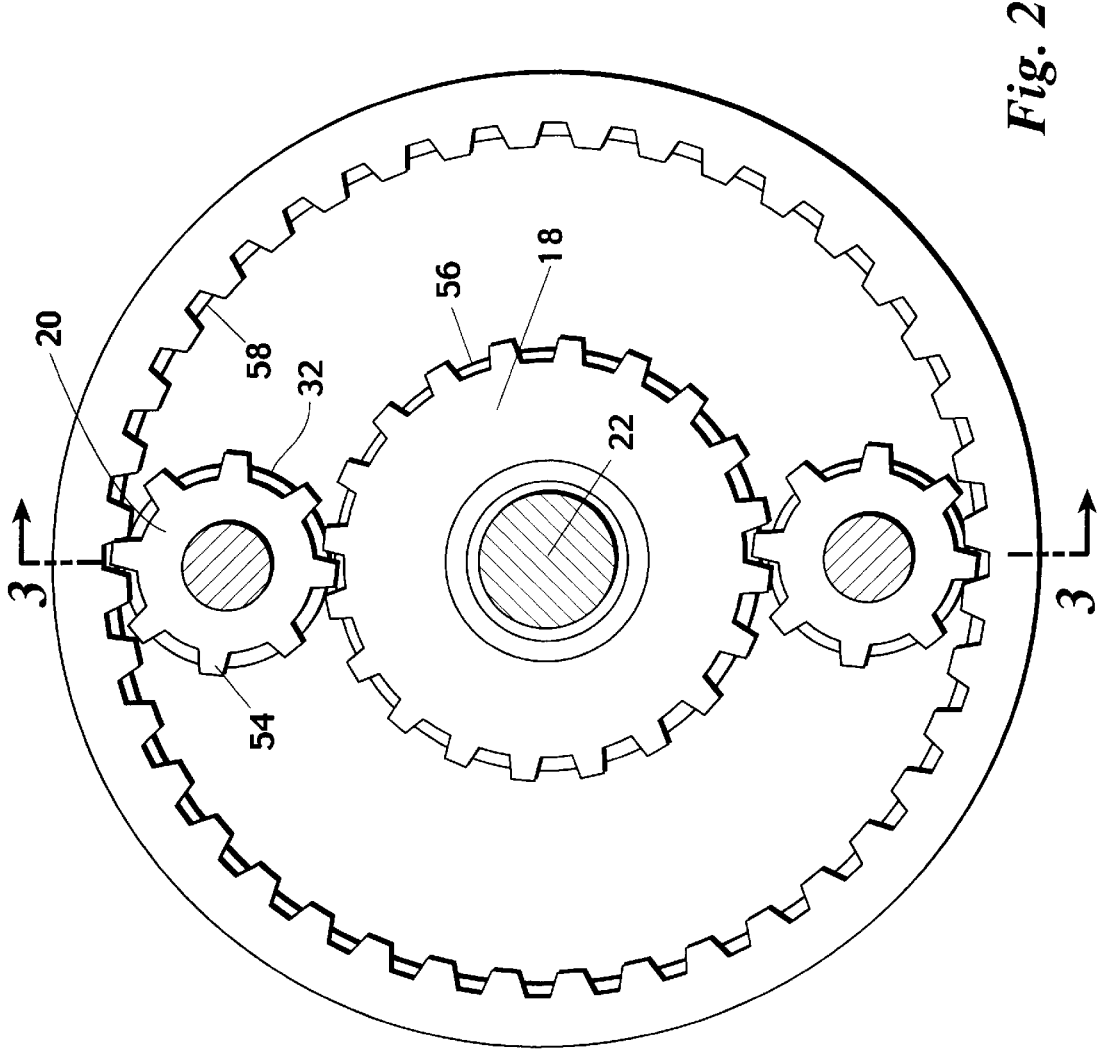
FIG. 2 is a view taken along the line 2—2 of FIG. 1.
Figure 3:
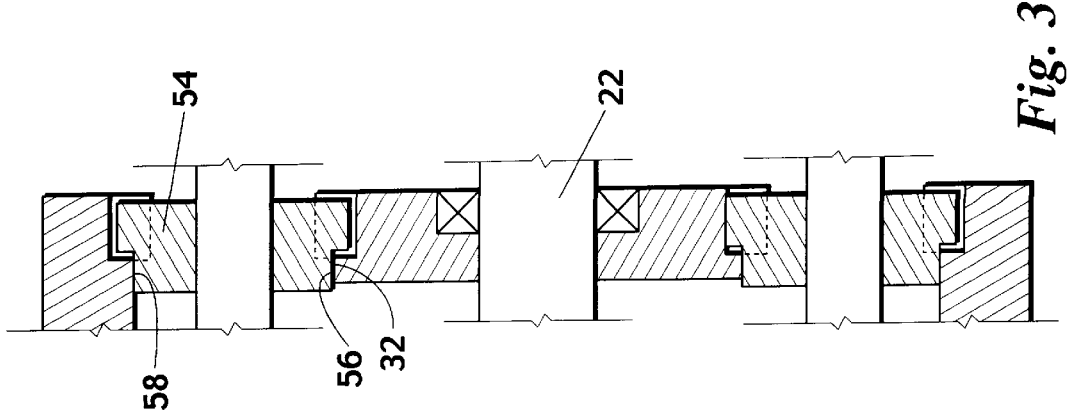
FIG. 3 is a view taken along the line 3—3 of FIG. 2.
Figure 4:
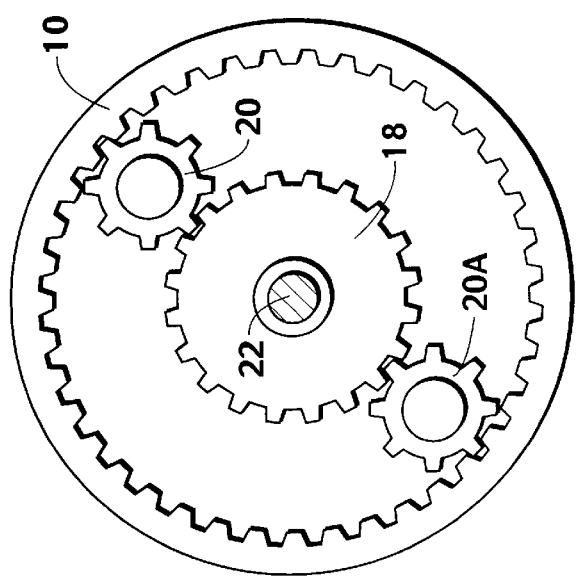
FIG. 4 is a view taken along the line 2—2 of FIG. 1 but shows less detail than FIG. 2 and illustrates the relationship of the input ring gear, input sun gear and the input planet gears which are between the input sun gear and the input ring gear.

Attention is now directed to FIG. 1 which is mostly in cross section showing the main components of this infinitely variable geared device. Shown thereon is a dotted line A—A. To the right of the dotted line is the portion that I call the power input section and to the left is the power output section. The power input side includes ring gear 10, a sun gear 18 rotatably mounted by use of bearings 28 on shaft 22. Between the ring gear 10 and the sun gear 18 is a plurality of planet gears 20 and 20A. As can be seen in FIG. 4, there are only two planet gears illustrated for the purpose of simplicity in describing the invention. However, any reasonable number of planet gears can be used such as 3 or 4, although 3 is probably preferred.

As can be seen more clearly in FIGS. 1, 2, 3 and 7 the various gears have shoulders to control the meshing of the teeth in each gear associated with the planetary gears 20 and 20A. A shoulder 32 on planet gear 20, shoulder 56 on sun gear 18 and a shoulder 58 on ring gear body 14 is provided to take the radial pressure off of the gears and hold the planet gears 20 in place. Shoulder 32 of planet gear 20 is designed whereby the face diameter would be the same as average pitch diameter of the planet gear 20 and prevent the teeth 54 from binding if they were pushed into the base circle of the driven gear. The shoulder 32 by absorbing radial pressure permits the individual gear teeth 54 to only exert rotational force thus reducing wear and friction. Ring gear 10 has shoulder 58 and sun gear 18 has shoulder 56 which compliments the shoulders 32 of planet gear 20. Sun gear 18 has bearings 28 so it may rotate freely on shaft 22.

Figure 8:
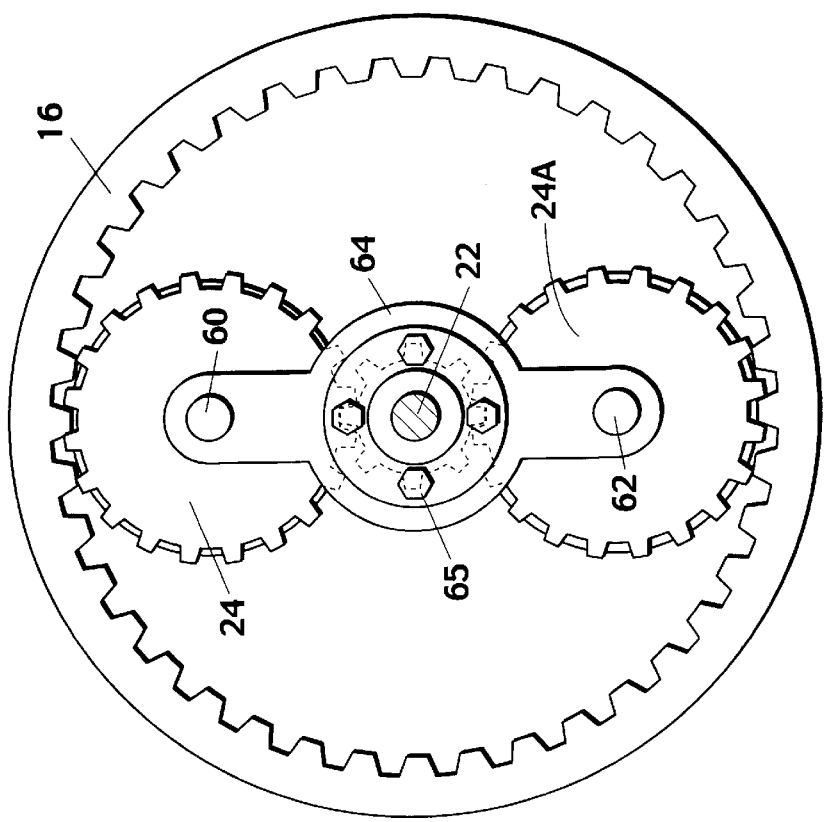
FIG. 8 is a view taken along the line 8—8 of FIG. 1 and is similar to FIG. 7 except that an output power takeoff arm has been provided for the output planet gears.
Figure 7:
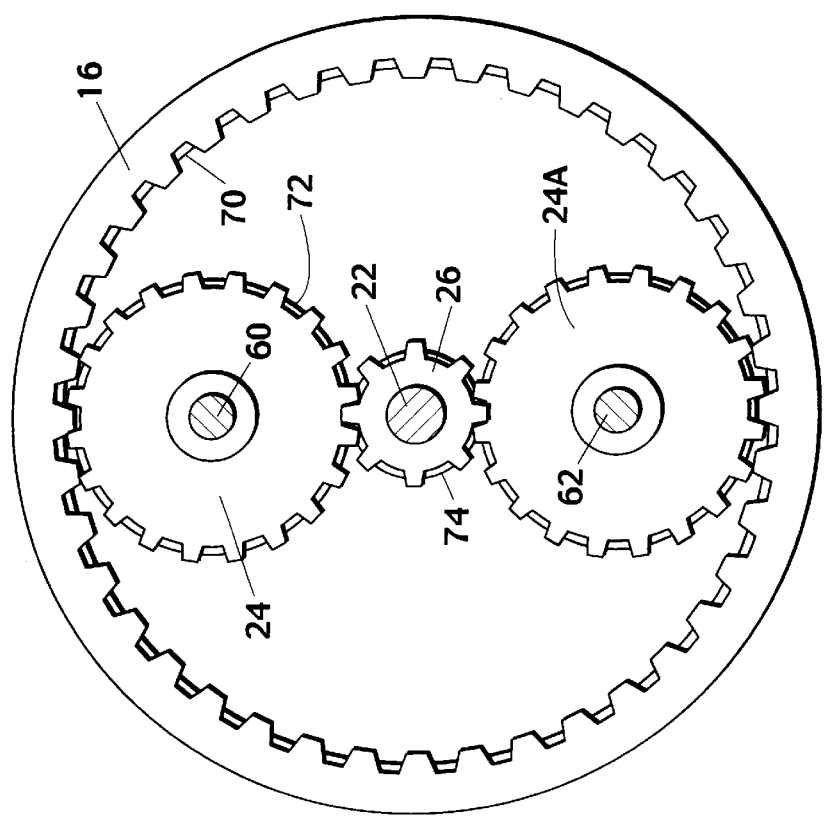
FIG. 7 is a view taken along line 7—7 of FIG. 1 and is a part of the power output side of the device of FIG. 1 and illustrates the output sun gear, output ring gear and two output planet gears intermeshing therebetween.

I shall now discuss the gears on the output side of the device and reference is made especially to FIGS. 1, 7 and 8. This includes an output ring gear 16 which is fixed to ring gear 10 and in the version shown is integral therewith. Both ring gears 10 and 16 are integral with housing 14. A sun gear 26 is rotatably mounted by use of bearings 30 on shaft 22. Input sun gear 18 and output sun gear 26 are fixed together as by a common shaft 25 so they rotate together. Output planetary gears 24 and 24A are positioned in the annular space between the output ring gear 16 and the output sun gear 26 and the planet gear 24 gear teeth mesh with both the sun gear 26 and the ring gear 16 as indicated and shown in FIG. 1. Output planetary gear 24 has an axle 60 and planet gear 24A has axle 62. A connecting arm 64 connects axle 60 and 62 (also see FIG. 8). Thus, as the output planet gears 24 and 24A rotate about the shaft 22, the arm 64 rotates as it is fixed to shaft 22. Preferably, the gears on the output side also have shoulders, although it is not absolutely necessary, but is desirable. Output ring gear 16 has shoulder 70 which cooperates with shoulder 72 of the planet gear 24 and the planet gear's shoulders 72 cooperate with shoulder 74 of sun gear 26. These shoulders are not as important as the other shoulders on the gears on the input side because the output planet gears are held in position by the output arms 64.

I shall next discuss the structure on the input side of the device which permits force to be applied on the input planet gears 20 and 20A forcing them either toward the ring gear 10 or the sun gear 18 with a selected force to be applied radially or at an angle to the radial position. This embodiment includes hydraulic cylinder 46 having piston rod 48. Other type power sources such as mechanical or electrical could be used for moving and/or applying force to the planet gear. The end of housing 46 is connected to pivot 50 at the end of axle 51. (See FIG. 6) The piston rod 48 is connected to pivot 49 at the end of axle 38 of the planetary gear 20 as shown in FIG. 1 and more clearly in FIGS. 5 and 6 arm 36 is supported on bolts 44 which extend from header plate 55 which is attached to the shaft 12 from drive force 11 (shown in FIG. 1). Thus the rotation of shaft 12 causes the main arm 36 to rotate and this causes the planet gears 20 and 20A to be rotated likewise in the annular space between the ring gear 10 and the sun gear 18. Arm 36 is rotatably mounted by bearings 23 on shaft 22. Means, such as pins, etc. not shown, causes the arm 36 to be maintained on the shaft 22 in the proper position.

Figure 9:
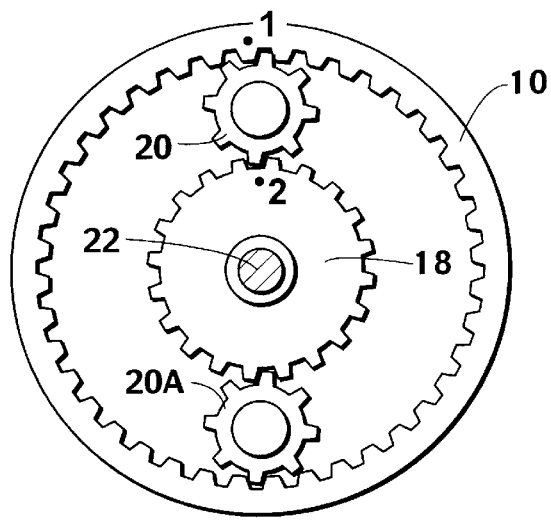
FIG. 9 is a sketch showing the relationship of the input sun gear, the input ring gear and the two input planet gears as shown in FIG. 1 with no force applied.
Figure 10:
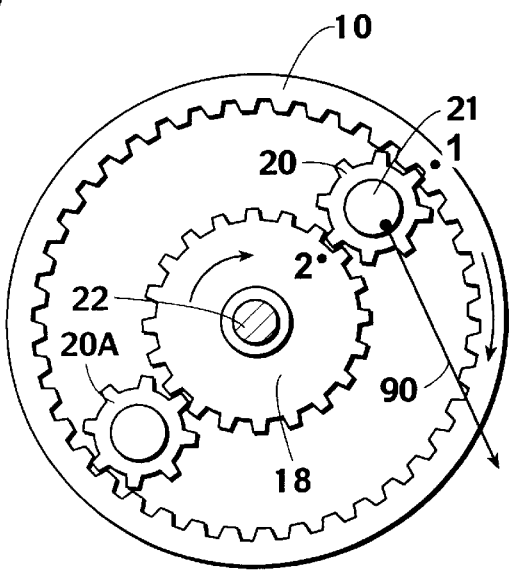
FIG. 10 is similar to FIG. 9 and is such that it shows a point of pressure being applied to an input planet gear and indicates the motion.

Attention is now directed to FIGS. 9, 10, 11 and 12 to illustrate the apportionment of rotational force between the ring gear 10 and the sun gear 18 as an external force is applied on the planet gear 20 to move the planet gear 20 around the annular space between the sun gear 18 and the ring gear 10. The various gear shoulders have been omitted for simplification. In FIG. 9, the gears are all at rest with no force applied. There is reference point 1 on ring gear 10 and a reference point 2 on sun gear 18. In FIG. 10 as illustrated, a point pressure as indicated by arrow 90 is applied at point 21 on the planetary gear 20 by the small circle inside. The direction to which the force is applied is shown by arrow 90 and force is applied at a right angle to a line defined by the point's planetary gear 20 contact with sun gear 18 and with ring gear 10. In this configuration of illustrated force, the planetary gear 20 does not turn about its axis. However both ring gear 10 and sun gear 18 turn the same number of degrees such that the reference points 1 on the ring gear 10 and 2 on the sun gear 18 remain in the same relation to one another but turn together as the arrows indicate.

Figure 11:
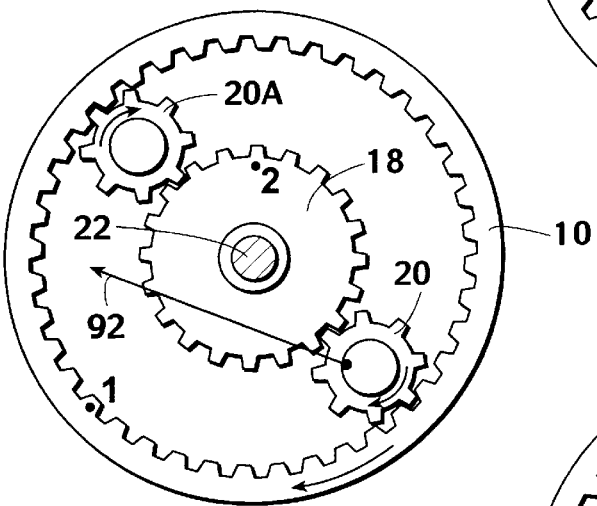
FIG. 11 is similar to FIG. 10 and is used to indicate the direction of rotation when the applied force is angled inwardly toward the input sun gear.

FIG. 11 shows the applied force to be angled inwardly toward sun gear 18 from the planet gear 20 as indicated by arrow 92. When this force is applied, planet gears 20 and 20A now rotates about its axis clockwise as the arrow on the planet gears indicate and ring gear 10 also rotates clockwise as the arrow indicates moving the reference point 1 on the ring gear 10 further clockwise. However, little or no force is applied to influence sun gear 18 to rotate so reference point 2 stays at about the same place as in FIG. 9.

Figure 12:
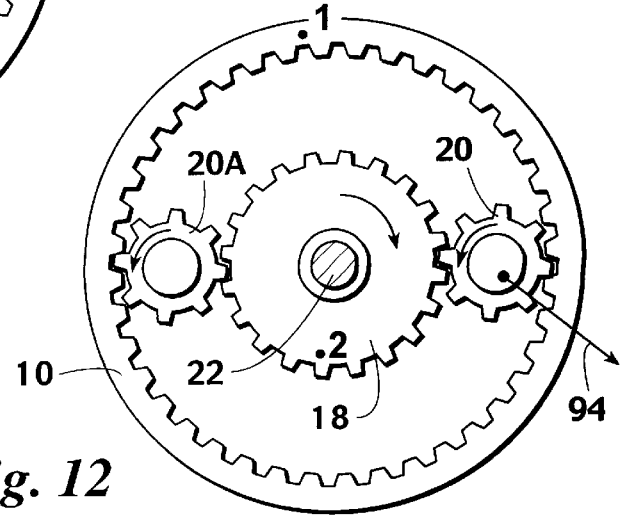
FIG. 12 is similar to FIG. 11 and is used to show the rotation of the planet gear and sun gear when force is applied at an angle away from the sun gear.

FIG. 12 shows the applied force as indicated by arrow 94 to be applied at an angle away from the sun gear 18 and more toward ring gear 10. This causes planetary gear 20 to tend to rotate about its axis counterclockwise as the arrows indicate which causes the sun gear 18 to rotate clockwise as indicated by its arrow. Reference point 2 on the sun gear 18 moves ahead. Little or no force is applied to influence ring gear 10 to rotate so reference point 1 stays at about the same place as in FIG. 9.

Attention is next directed to FIGS. 19 and 20 to illustrate the approximate rotational force between the ring gear 10 and the sun gear 18. Attention is first directed to FIG. 19 which shows a portion of planet gear 20 between a portion of a sun gear 18 and a ring gear 10. The force A is an angular force from an arm that would be attached to gear 20 such as arm 296 and 296A of FIG. 13. Force B is a lateral or side force exerted by the hydraulic force of cylinders 272 and 272A. These two forces create resultant vector force C. If the load on the transmission were to increase suddenly requiring more energy from force A then without increasing force B, the resultant force C moves closer to force A and the transmission as designed in the drawings shown with a smaller sun gear 26 on the output than that sun gear 18 on the input would increase the ratio automatically, such that the output would slow down under a load and this would be more self-regulating. This style would be useful in some engineering design applications.

FIG. 20 illustrates the use of a section of ring gear 10, section of sun gear 18 with planet gear 20N in between. Planet gear 20N is hollow and has a bearing 300 inside. Arrows D, E and F are vector forces. Force F is the energy from an arm such as 296 and 296A of FIG. 13 and force D represents the energy from hydraulic cylinders 272 and 272A. Force E is the resultant force. If the load on the transmission suddenly increases, the resultant vector E does not necessarily move closer to force F and therefore the output ratio won't change. Rather, more energy from the driving force will be required to maintain the same speed.

Figure 6:
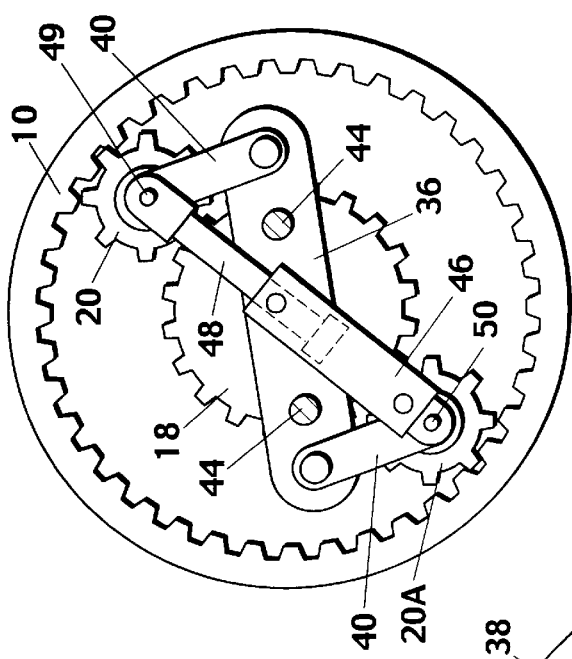
FIG. 6 is a view taken along line 6—6 of FIG. 1 and is similar to FIG. 5 except that a power means has been added to provide the force to the levers for forcing the planet gear selectively toward either the ring gear or the sun gear.
Figure 5:
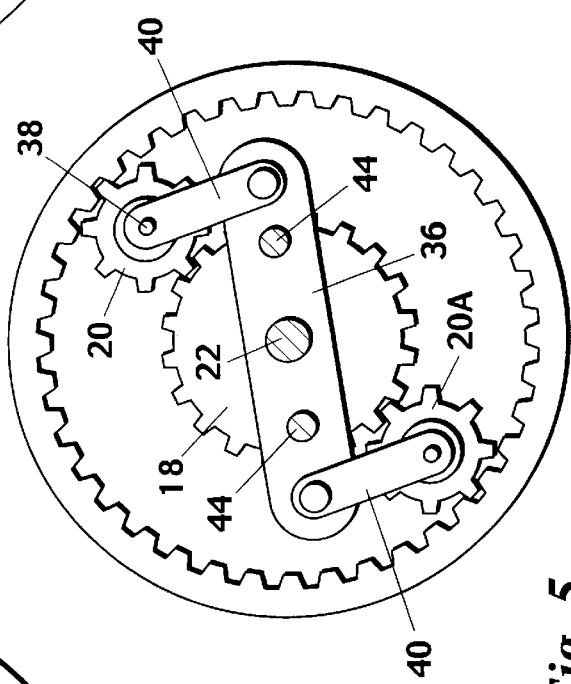
FIG. 5 is a view taken along the line 5—5 of FIG. 1 and illustrates the main arm and levers for use in this system of forcing the planet gear selectively toward the ring gear or toward the sun gear.

Thus the broad concept, clearly shown in FIGS. 4, 5 and 6, is to move piston rod 48 in or out so as to push in or out on the planetary gears 20 and 20A and push harder on either the sun gear 18 or ring gear 10 to obtain a variation in torque output (that is obtain speed ratio changes).

In further explanation and referred by in the embodiment of FIG. 1, it can be said that the rotation of shaft 12 causes rotation of the planet gears 20 and 20A about shaft 22 through plate 55, arms 44, plate 36 and arms 40 and axles 38 and 51. For each revolution of shaft 12, if there is no external straight line force applied to the planet gear 20 and 20A, the ring gear 10 will rotate in accordance with its ratio of resistance to motion, derived from the input/output sun gear selected gear 18/26 ratio and the input/output ring gear 10/16 selected gear ratio. However, by applying the external force as indicated by arrows 90, 92 and 94 of FIGS. 10, 11 and 12, the amount of rotation of ring gear 10 and sun gear 18 about shaft 22 will vary in accordance with the force applied to planetary gear 20 due to the change in proportioning of rotational power to input ring gear 10 and input sun gear 18 as shown in those figures. By applying selected forces as indicated in FIG. 12, assuming there is an equal amount of resistance to motion from that which the ring gear 10 and sun gear 18 are attached, the reference point 1 does not move on the ring gear 10. Thus, by changing the force, including its magnitude and direction on the planetary gear 20 to force the planetary gear 20 against the ring gear 10 or against the sun gear 18 with selected values one can affect the ratio of the rotation of the ring gear unit 14 with respect to the rotation of sun gear unit 18, 25 and 26. When the system is in neutral the sun gear input 18 rotates in one direction and the ring gear 10 rotates in the opposite direction in order to cancel out the effects on the planet output gear 24 so that it won't rotate about shaft 22. The values of the various vectors can be calculated using engineering principles.

Figure 18:
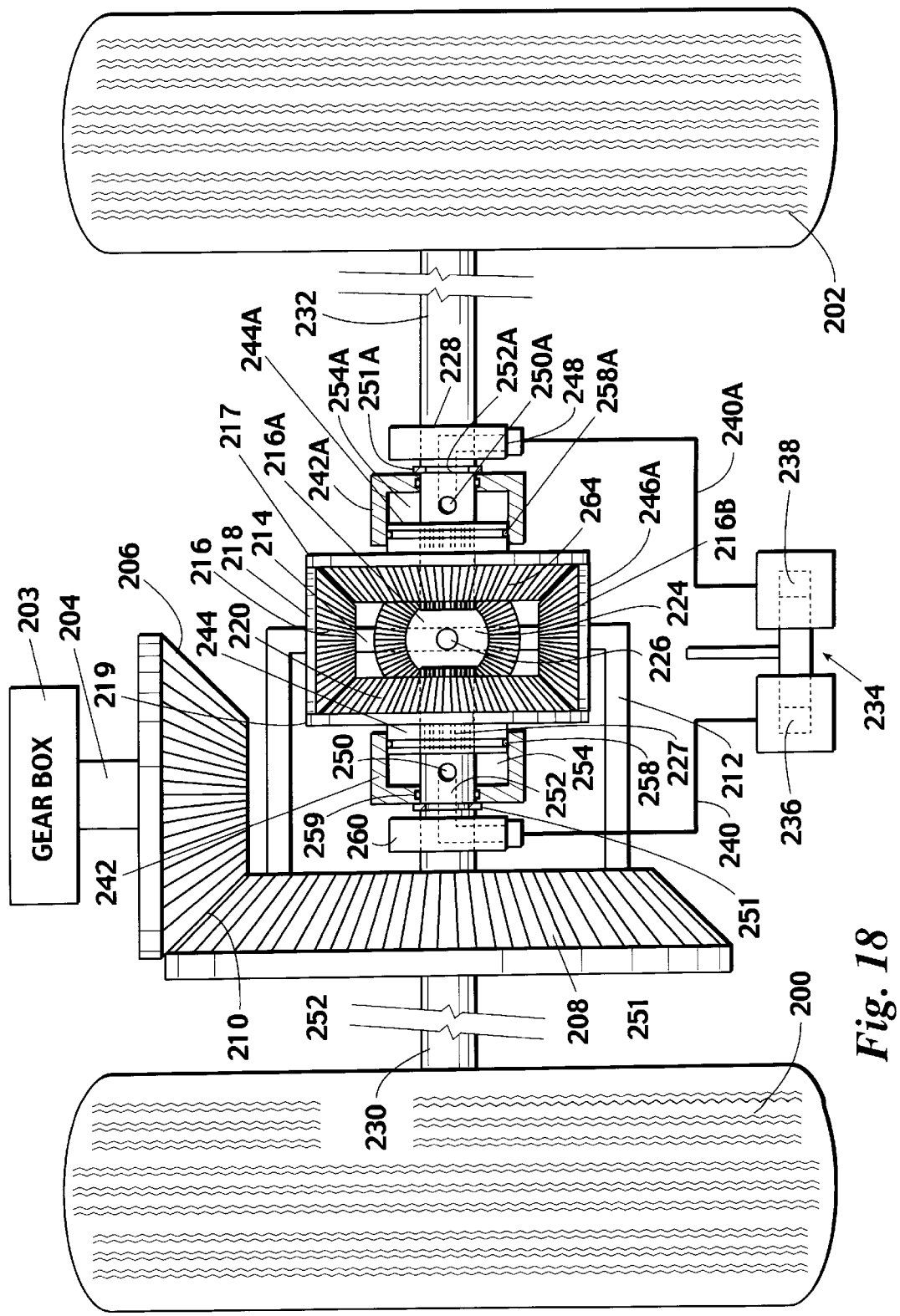
FIG. 18 illustrates a bevel gear type transmission to demonstrate another variation in the configurations available for the basic idea as illustrated in FIG. 1.

The reference points of FIGS. 9, 10, 11, 12 are all assuming an equal amount of resistance to motion from what they are attached to. In a working system there will nearly always have to be an imbalance of resistance through gear ratio changes, except in the case of a system such as shown in FIG. 18.

It is noted that as shown in the drawings that output sun gear 26 is considerably smaller than input sun gear 18 and that ring gears 16 and 10 are substantially the same diameter. Further, the output planet gears 24 are much larger than the planet input gear 20. These size ratios can be varied in accordance with engineering principles and desired effect.

Figure 13:
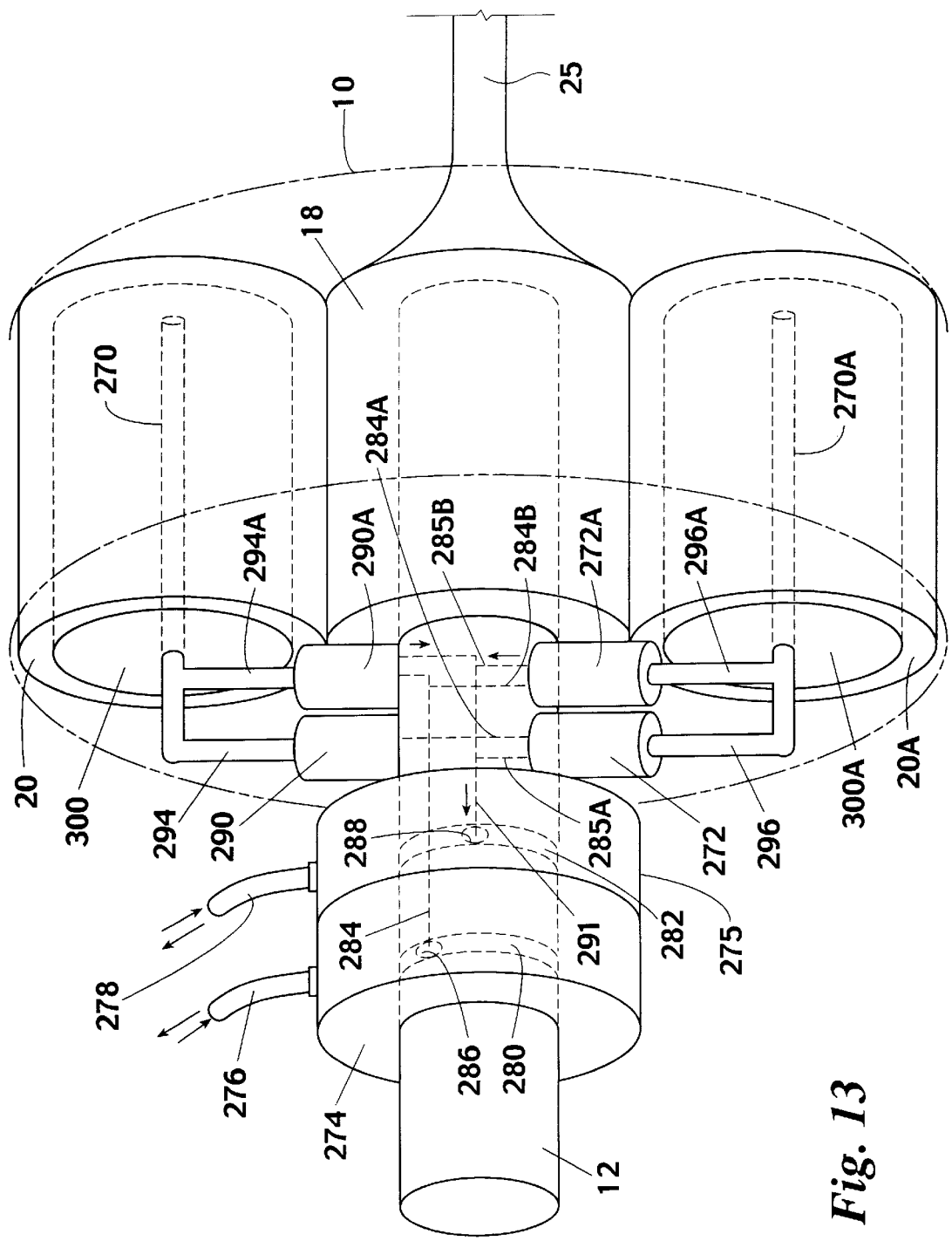
FIG. 13 is an isometric view to illustrate one system of supplying hydraulic control fluid to the hydraulic cylinder shown in FIGS. 1 and 6.

Attention is next directed to FIG. 13 to show a hydraulic fluid flow system useful for driving a hydraulic cylinder such as hydraulic cylinders 46 shown in FIG. 6.

Shown in FIG. 13 is a power input shaft 12 on which is rotatably mounted sun gear 18 which is connected by shaft 25 to an output sun gear (not shown). A ring gear 10 is also shown. Between the ring gear 10 and the sun gear 18 are two planet gears 20 and 20A; each planet gear 20 and 20A meshes with ring gear 10 and with sun gear 18. These planet gears 20 and 20A have axles 270 and 270A. These axles 270 and 270A have ball bearings 300 and 300A. The planet gears 20 and 20A rotate individually upon its respective axle and also rotates within the annular space between the sun gear 18 and the ring gear 10 as input power shaft 12 rotates. Shaft 12 is fixed, either directly or indirectly, to hydraulic cylinder 290 and 290A which is connected through piston rods 294, 294A to axle 270 for planet gear 20. Likewise, the shaft 12 is fixed to hydraulic cylinder housing 272 and 272A whose piston rods 296 and 296A are fixed to axle 270A of planet gear 20A. Thus as shaft 12 rotates, the axle 270 and 270A rotates with shaft 12 about the axis of the shaft 12 and within the annular space between the ring gear 10 and the sun gear 18. As hydraulic fluid is fed to cylinders 290, 290A and 272 and 272A the respective planet gears 20 and 20A are forced against either the sun gear 18 or the ring gear 10 in accordance with the direction and force of the hydraulic fluid.

Rotatably and sealably mounted on shaft 22 is a sealing unit comprising a first portion 274 and a second portion 275. Section 274 has an internal circumferential groove or channel 280 which is in fluid communication with the input conduit 276. Channel 280 is in fluid communication with the longitudinal internal passage 284 which is inside shaft 12 and makes its communication through hole 286. Passage 284 is in fluid communication with lateral channels 284A and 284B which go respectively to cylinders 272, 272A, 290 and 290A. These conduits provide fluid under pressure to the power side of hydraulic cylinders 272, 272A, 290 and 290A.

I shall now discuss the conduit arrangement for the down or relief side of the hydraulic cylinders 272, 272A, 290 and 290A. This includes an internal groove 282 inside seal section 275. This is in fluid communication with the output conduit 278. An internal passage 291, inside shaft 12, is in communication with internal circumferential channel 282 through hole 288. Passage 291 has lateral passages 285A and 285B to thus let spent hydraulic fluid from hydraulic cylinders 272, 272A, 290 and 290A be discharged through lateral conduits 285A and 285B, conduit 291, channel 282 and discharge conduit 278. By controlling the injection pressure through conduit 276 and discharge pressure through conduit 278 one can control the amount and direction of force exerted on planet gears 20 and 20A. One can put greater pressure on conduit 276 than on conduit 278 or can reverse that to obtain the desired effect. Similar conduit laterals will be made to cylinders 290 and 290A as to cylinders 272 and 270A.

Attention is next directed to FIG. 18 which shows the principle of my invention in operation as applied to a drive mechanism for driving a vehicle such as an automobile. Shown thereon is a drivers side wheel 200 and a passenger side wheel 202. An input drive shaft 204 is connected to a power bevel gear 206. The input drive shaft 204 will be through a transmission 203 similar to the one shown in FIG. 1 or more often with an input section such as FIG. 13 for driven rotational motion. The bevel gear 206 is meshed with beveled drive gear 208 which has gears 210. Bevel gear 208 has arms 212 extending outwardly therefrom toward the planet gears 216, 216A, 216B, etc. There are normally two or more of these extending out, one for each planet gear, and these arms each has a connecting arm 214 and 224 which rotatably supports planet bevel gears 216. 216A 216B, etc. Although not shown, each planet gear has a connecting bearing about which it is rotatably supported. As input drive shaft 204 is rotated, beveled gear 206 rotates bevel gear 208. As bevel gear 208 rotates, it rotates the drive arms 212, of which there are four in this particular example, and they in turn rotate bevel planet gears 216, 216A and 216B, etc.

As the planet gears 216, 216A, 216B, etc. rotate in response to the rotation of bevel gear 208 through arms 212, they rotate bevel gears 220 and 264. Shoulders 217 and 219 on bevel gear 264 and 220, respectively, support side thrust on shoulders 218 and 246A of planet gear 216, 216B, etc. The ratios of lateral force applied between bevel gear 264 and the planet gears 216, 216A, 216B, etc. and that force applied between bevel gear 220 and the planet gears 216, 216A, 216B, etc. determines the relative rotation between the two bevel gears 220 and 264.

When no lateral force is applied against either shoulder 217 of bevel gear 264 or shoulder 219 of bevel gear 220 the car moves straight. More lateral force against bevel gear 264 than against bevel gear 220 makes the car pull toward the passenger side or vice-versa if the lateral force were reversed. It is desirable to provide a gear box 203 with a reverse option on input shaft 204.

There is a shaft 230 which is the axle of the driver's side wheel 200 on the outer end and rotatably supports bevel gear 208. A driver's side bevel gear 220 with shoulder 219 is connected to shaft 230 by splines 227 such that bevel gear 220 has limited longitudinal movement with respect to shaft 230 but rotates therewith.

A steel housing 260 surrounds shaft 230 and shaft 230 rotates within the housing 260. The interior of the housing 260 surrounds at least one hole in the shaft 230. Passage 252 which extends inside shaft 230 and exit hole 250 so that the hole 250 is in communication with the space 254 inside the housing 242. Housing 242 surrounds circular base 244 which is fixed to bevel gear 220. Stops 251 and 251A hold housings 242 and 242A from moving outwardly beyond the stops when pressure is applied in spaces 254 and 254A. Seals 258 and 259 keep the space 254 sealed tight. The amount of pressure on the oil in space 254 determines the force with which the shoulder 219 or bevel gear 220 is forced against bevel gears 216, 216A, 216B, etc.

Bevel gear 220 is mounted on shaft 230 in such a manner so that gear 220 rotates with the shaft but has longitudinal movement. This is accomplished by mating splines unit 227 on shaft 230 and on the hub of bevel gear 220. A similar arrangement is provided for the passenger side.

The passenger side of the transmission includes a bevel gear 264 which meshes with the gears 216A, 216B, etc. and has a shoulder 217. This gear 264 is connected to shaft 232 similarly as is gear 220 connected to shaft 230.

Similar apparatus is used to supply force forcing the bevel gear 264 toward the bevel gears 216, 216A, 216B provided on the passenger side for forcing bevel gear 264 against the bevel gears 216, 216A and 216B, etc. but in an opposite direction. Side 238 of master cylinder control 234 is connected to output seal 228. If hydraulic fluid of greater pressure is projected through lines 240A than through conduits 240 then there is more lateral force between bevel gear 216, 216A, 216B, etc. and bevel gear 264 than there is applied force of the bevel gear 220 against the same planet gears 216, etc. When this occurs more rotational force is applied to bevel gear 220 than is applied against bevel gear 264 and there is thus more rotational force applied to driver's side wheel 200. If the force magnitude ratio is reversed, that is if there is more lateral force applied on the driver's side bevel gear 220 and shoulder 219 than on the bevel gear 264 and shoulder 217 on the passenger side, then the bevel gear 220 will be pushed harder against the bevel gears 216, 216A, 216B, etc. than the force of the passenger side bevel gear 264 and shoulder 217 against the bevel gears 216, etc. Thus more rotational force is applied to bevel gear 264 than against bevel gear 220 and the passenger wheel 202 turns harder than the driver's side wheel 200.

This structure just described in operation is capable of changing the amount of rotation bevel planet gear 216, etc. applies to either bevel gear 220 and/or bevel gear 264 which changes the rotational force making it possible to control the proportionate of power to the two wheels, or any other multiple output device.

Figure 14B:
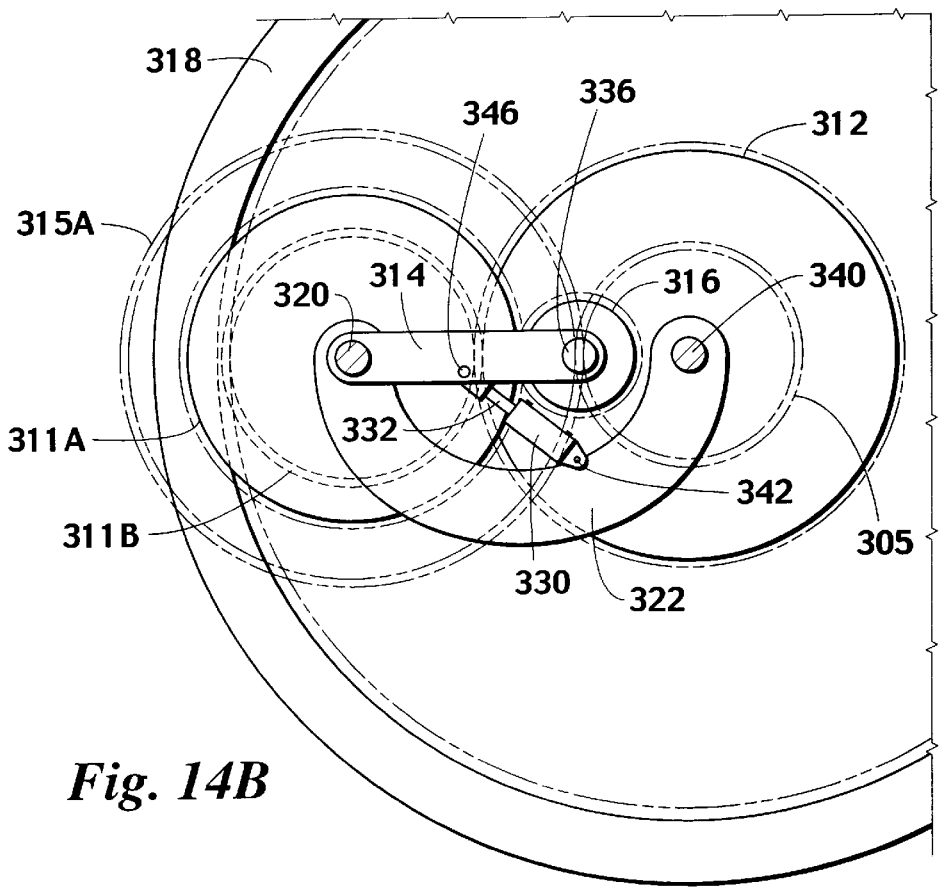
FIGS. 14A and 14B illustrate schematically a different system for applying proportional power to the ring gear and the sun gear.
Figure 14A:
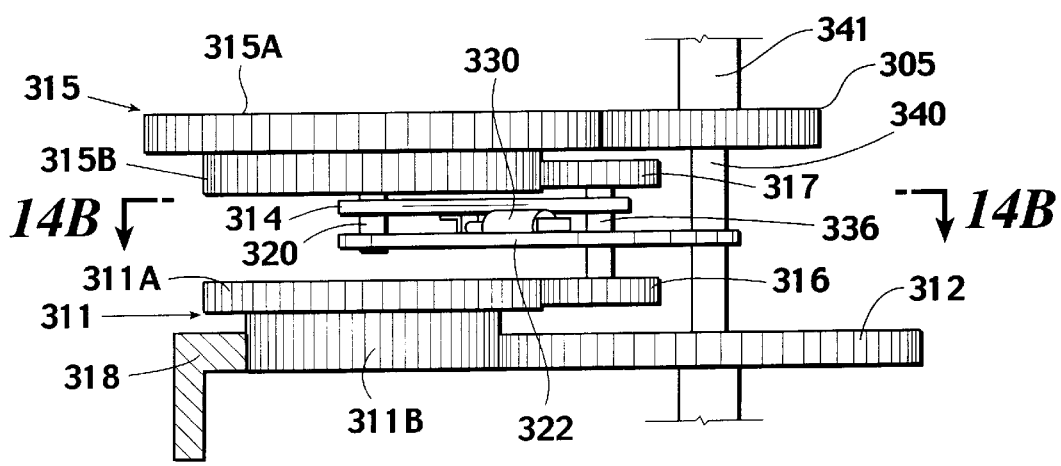

Attention is now directed to FIGS. 14A and 14B. Shown thereon is an input power axle 341 which is fixed to input shaft gear 305. An idler 315 is comprised of an upper larger diameter gear 315A and a lower smaller diameter gear section 315B. Sections 315A and 315B are fixed together or may be integral. Upper idler section 315A meshes with the input shaft gears 305. A shuttle gear assembly includes an upper shuttle gear 317, an axle 336 and a lower shuttle spur gear 316. Spur gear 317 meshes with gear section 315B. The axle 336 is fixed to each gear 316 and 317.

Ring gear 318 is provided. Also a sun gear 312 is rotatably mounted to axle 340.

A planetary gear unit 311 is provided and includes a planetary face gear 311A which meshes with shuttle spur gear 316. Also a part of the planetary gear unit 311 is a lower circular gear 311B. Planetary gear 311B meshes with ring gear 318 and sun gear 312. As shown in FIG. 14A and more clearly in 14B, a strap 322 is connected between axle 340 and idler axle 320. A control arm 314 is rotatably attached to idler gear axle 320 and to the axle 336 of shuttle gears 317 and 316. Means are provided to rotate the control arm 314 about pivot 320 thus rotating the shuttle gears 316 and 317 about the periphery of idler gear 315B and planetary face gear 311A. This power means includes hydraulic cylinder 330 whose housing is pivotally connected at 342 to strap 322. The outer end of piston rod 332 is connected at pivot 346 to control arm 314.

This device just described in relation to FIGS. 14A and 14B is to provide a means to change the proportioning of power applied between the ring gear 318 and the sun gear 312. Power is supplied to the device through input power axles 341 and input shaft gear 305 which rotates the idler gear 315 which in turn through lower plate gear 315B rotates the shuttle spur gear 317 which in turn rotates shuttle spur gear 316. This gear 316 meshes with planetary face gear 311A and rotates planetary gear section 311B. The gears of gear section 311B are meshed with the ring gear 318 and sun gear 312. By rotating shuttle spur gear 316 about planet face gear 311A I am providing means to change proportioning of power applied between the ring gear 318 and the sun gear 312.

Attention is now directed especially to FIGS. 15, 16, and 17. FIGS. 15, 16 and 17 show positions that shuttle gear 316 may be placed in relation to planetary face gear 311A. Of course, shuttle gear 316 can be placed anywhere in between the positions shown. In these three figures there are shown fragments of sun gear 312, ring gear 318, planetary gear 311B and planetary face gear 311A. Shuttle spur gear 316 is shown meshing with the planetary face gear 311A.

There are two arrows associated with the shuttle gear 316 and shows the forces applied to it if the input shaft gear 341 of FIG. 14A was rotated counterclockwise. The arrow 350 next to ring gear 318 and arrow 352 next to sun gear 312 represents the force applied to them from the results of where the shuttle gear 316 is placed. The bolder the arrow the larger the force in comparison with the other force. In FIG. 15, there is more counterclockwise force on ring gear 318 than on sun gear 312, but both forces are in a counterclockwise direction. In FIG. 16, the position of shuttle gear 316 is less than about ninety degrees from that in FIG. 15. The more dominate force (which is now arrow 352) is shifted to sun gear 312; but both forces still push in the counterclockwise direction. In FIG. 17 the dominant force (arrow 352) is counterclockwise on the sun gear. Force (arrow 352) is counterclockwise on the sun gear 312 but because of the cantilevered action that takes place where planetary gears 311B meshes with sun gear 312 there is provided a clockwise force 350 to ring gear 318. As long as the sun gear 312 and ring gear 318 rotate in opposite directions, the planetary gear of the output section (not shown in this drawing) can rotate about its axis enough to keep the output shaft (also not shown in this drawing) from turning therefore providing a neutral position (such as output shaft 22 in FIG. 1). Any output can be obtained from such output planetary gears in a manner similar to the output on planetary gears 24 in FIG. 1.

Consider FIG. 17. If the sun gear 312 were provided with a brake mechanism (not shown) sun gear 312 should not move. Ring gear 318 would still move clockwise as indicated. Because of the braking mechanism sun gear 318 would not rotate. If the ring gear 318 moves clockwise then an output planetary gear such as gear 24 in FIG. 1 (but not shown here) would rotate clockwise while the input shaft 341 of FIG. 14A would rotate counterclockwise. By doing this one could generate a reverse gear. This will only provide one specific gear ratio for the reverse portion of the transmission instead of the infinitely variable ratio portions in the forward direction. This still should be useful in some engineering applications.

Thus, it is apparent that there has been provided, in accordance with the invention, an infinitely variable transmission that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A transmission which comprises:

an input power source;

an input ring gear;

a sun gear shaft;

an input sun gear mounted on said sun gear shaft;

at least one input planet gear positioned to mesh with said input ring gear and said input sun gear;

a connection between the input power source and said at least one input planet gear whereby said input planet gear will move in response to said input power source;

an output ring gear fixed to said input ring gear;

an output sun gear fixed to said sun gear shaft;

at least one output planet gear;

an output drive connected to said at least one output planet gear;

a main arm for selectively forcing said input planet gear toward said input ring gear or forcing it toward said input sun gear.

2. A transmission as defined in claim 1 including a control power source for driving said arm.

3. A transmission as defined in claim 2 in which the input sun gear has a larger radius than the output sun gear.

4. A transmission as defined in claim 2 in which the ratio of the diameter of the input sun gear to the diameter of the output sun gear is between about 1 and 100.

5. A transmission as defined in claim 2 in which the ratio of the diameter of the input ring gear to the diameter of the output ring gear is between about 1 and 100.

6. A transmission as defined in claim 1 in which said main arm is rotatably mounted on said sun gear shaft and in which there is at least a first input planet gear and a second input planet gear;

an axle pivot connected to the center of each of said input planet gears;

a first secondary arm pivotally mounted on one end of said main arm and at its other end pivotally connected to the pivot of the first input planet gear and a second secondary arm pivotally mounted from the other end of said main arm to said pivot of said second input planetary gear;

a hydraulic piston having a housing and a piston rod, the outer end of said housing pivotally attached to said first pivot of said second input planet gear and the outer end of said piston rod connected to the pivot of said first input planet gear; and a power source connected to said hydraulic cylinder for selectively forcing the piston rod in or out.

7. A method of obtaining a transmission between an input power source and an output using positive mechanical engagement for transmission of power throughout which comprises:

providing an input ring gear and an input sun gear which will rotate about the same axis;

placing an input planet gear in the space between said input ring gear and said input sun gear so that as said input planet gear rotates within the space about said input sun gear, the teeth of said input planet gear meshes with the teeth of said input sun gear and with the teeth of said input ring gear;

driving said planet gear in said space while selectively forcing said planet gear toward said ring gear with more force than toward said sun gear or alternatively forcing said planet gear toward said sun gear with more force than toward said ring gear to change the proportion between power delivered to said input sun gear by said input planet gear and power delivered to said input ring gear by said input planet gear to obtain an output rotation whose speed is a selected ratio of the input input rotational speed.

8. A transmission which comprises:

an input rotational element to supply power to said transmission, said input rotational element being the sole element in the transmission adapted to receive rotational input energy from a driving source;

an output ring gear;

an output sun gear;

at least one output planet gear meshing with said output sun gear and with said output ring gear and imparting motion to an output planet-gear carrier;

means to obtain rotational power from said output planet-gear carrier as an output power from the combined effects of said output sun gear rotational speed and said output ring gear rotational speed;

means to vary the rotational ratio of said output sun gear with respect to said output ring gear such that the rotational speed of said output planet-gear carrier may vary continuously independent of the rotational speed of the input rotational element;

said means to vary the rotational ratio of said output sun gear with respect to said output ring gear using only positive mechanical engagement of elements.

9. A method of transmitting energy comprising the steps of:

providing a ring gear and a sun gear rotatable about a common axis and a space therebetween;

providing at least one planet gear in said space;

providing a planet-gear carrier which rotationally supports said at least one planet gear;

simultaneously providing a first rotational rate to said ring gear and a second rotational rate to said sun gear through use of only one source of input rotation and using positive mechanical engagement of elements without slippage, thereby applying power to said planet-gear carrier;

obtaining an output rotational rate which is continuously variable directly from said planet-gear carrier which is a function of said first and second rotational rates of said ring gear and sun gear respectively to provide an output power take-off.

10. A transmission which comprises:

a first rotatable gear;

a second rotatable gear;

an inner rotatable gear positioned between and meshing with both said first rotatable gear and said second rotatable gear;

means to apply a continually readily variable controllable force between said inner gear and said first rotatable gear and between said inner gear and said second rotatable gear to obtain a variation in the proportioning of power from the inner rotatable gear to the first rotatable gear and the second rotatable gear altering the rotational speed ratio between said first rotatable gear and said second rotatable gear.

11. A transmission as defined in claim 10 including a frame to support said inner gear in which said frame is rotatable about a center on an axis of said first and second rotatable gears.

12. A transmission as defined in claim 11 including:

a bevel power gear rotatable about the same axis as said first and second rotatable gears;

power source to rotate said power gear;

said frame supported from said power gear in a manner to rotate therewith.

13. A transmission as defined in claim 12 including a power take-off for said first rotatable gear and a second power take-off for said second rotatable gear.

14. A method of transmitting energy through a device having a rotational output which comprises:

transmitting energy through a single input to said device by positive mechanical engagement of components of said device;

proportioning out using positive mechanical engagement of the components necessary to proportion out a first portion of the input energy from an input planet gear to a first rotatable receiving element and a second portion to a second rotatable receiving element;

varying the ratio of the quantity of energy between said first portion and said second portion to obtain a selected ratio of the rate of rotation of said first receiving element and the rate of rotation of said second receiving element.

15. A method as defined in claim 14 including the step of using the rotational output of said first and second receiving elements to obtain a single output rotation for use as power.

16. A method of transmitting energy through a device having a first rotatable receiving element and a second rotatable receiving element which comprises:

transmitting input rotation energy to said device;

simultaneously proportioning out a first portion of the input energy, by use of positive mechanical engagement, from a planet gear to said first rotatable receiving element to impart to it a first rotational output and proportioning a second portion of the input energy from said planet gear to said second rotatable receiving element to impart to it a second rotational output;

varying, with a controlling device, the speed ratio between said first and second rotational outputs to obtain a desired ratio;

recombining said first and said second rotational outputs to provide a single rotational output which permits changing the speed ratio between the input rotational speed of the device and the output rotational speed of the device with the ability to continuously vary said speed ratio between the input rotational speed and the output rotational speed.

17. A transmission as defined in claim 1 including:

a first circumferential shoulder on said input ring gear;

a second circumferential shoulder on said input sun gear adjacent the teeth thereof;

a third circumferential shoulder on said input planet gear;

said third circumferential shoulder of a structure to mate with the interior surface of said input ring gear circumferential shoulder and with the input sun gear circumferential shoulder to take the load away from the teeth of the gears and thus prevent binding of the gears.

* * * * *